L. ANDERSON.
HARVESTING MACHINE.
APPLICATION FILED MAR. 13, 1914.
1,156,575.
Patented Oct. 12, 1915.
7 SHEETS—SHEET 1.
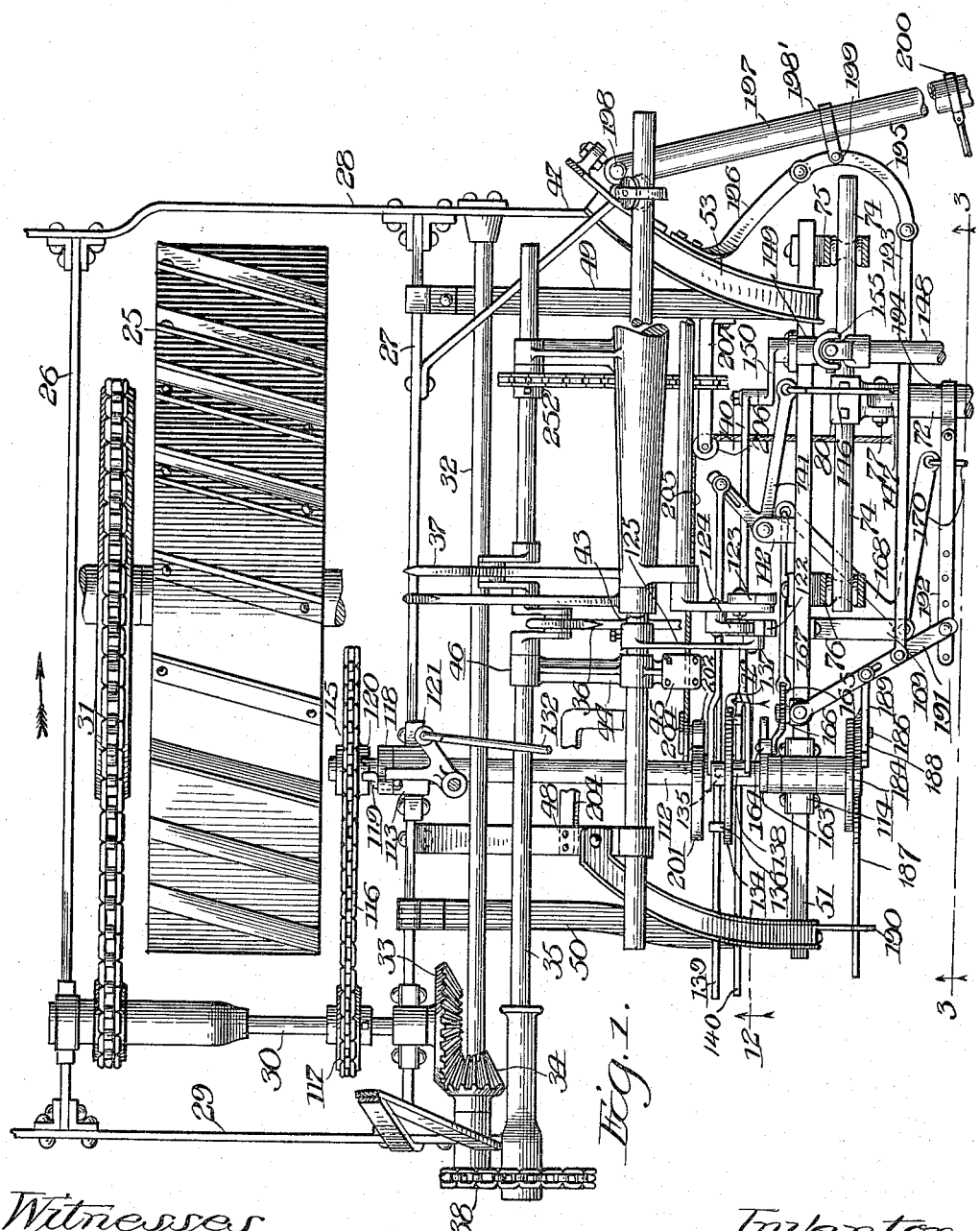

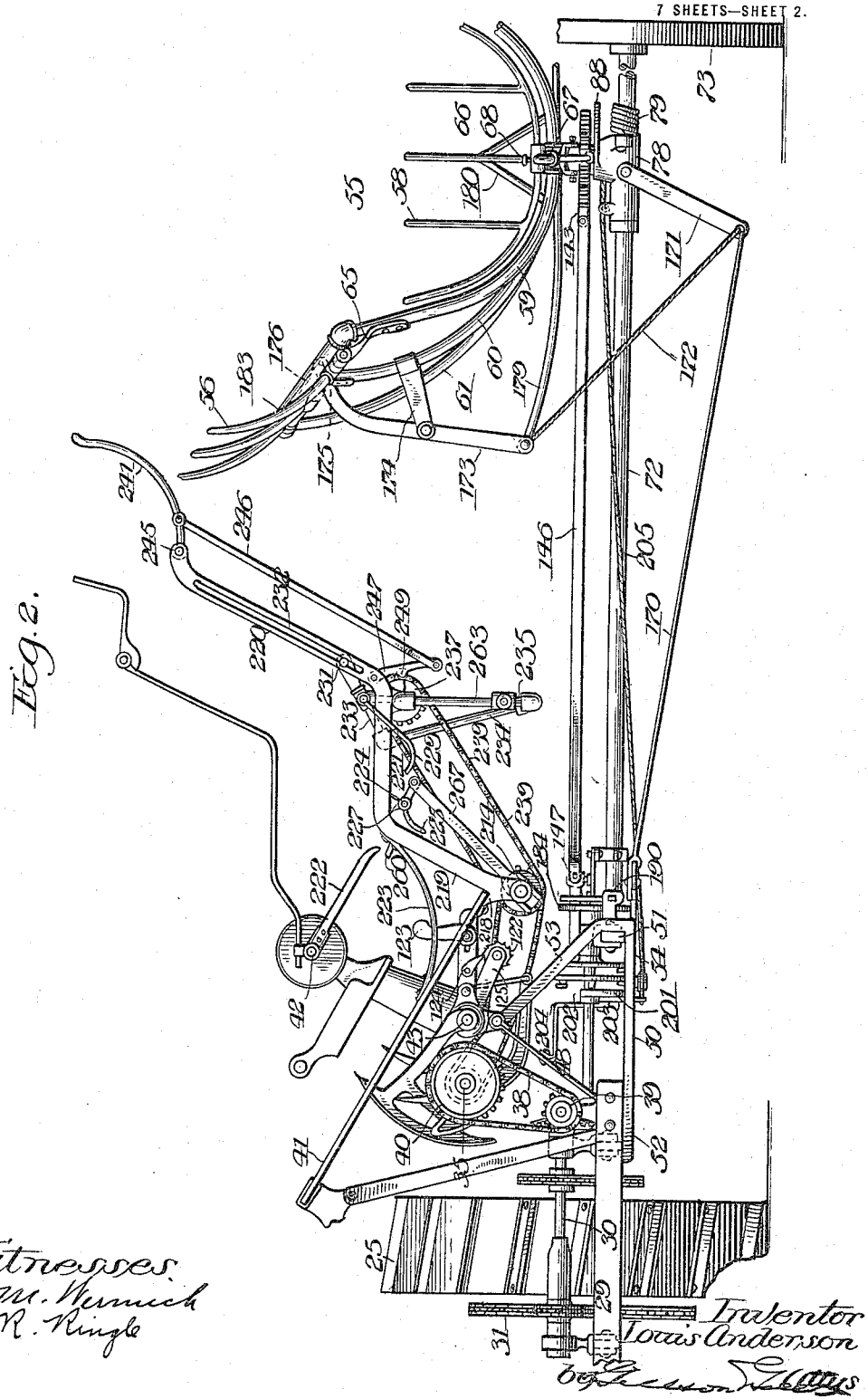

L. ANDERSON.
HARVESTING MACHINE.
APPLICATION FILED MAR. 13, 1914.
1,156,575.
Patented Oct. 12, 1915.
7 SHEETS—SHEET 3.
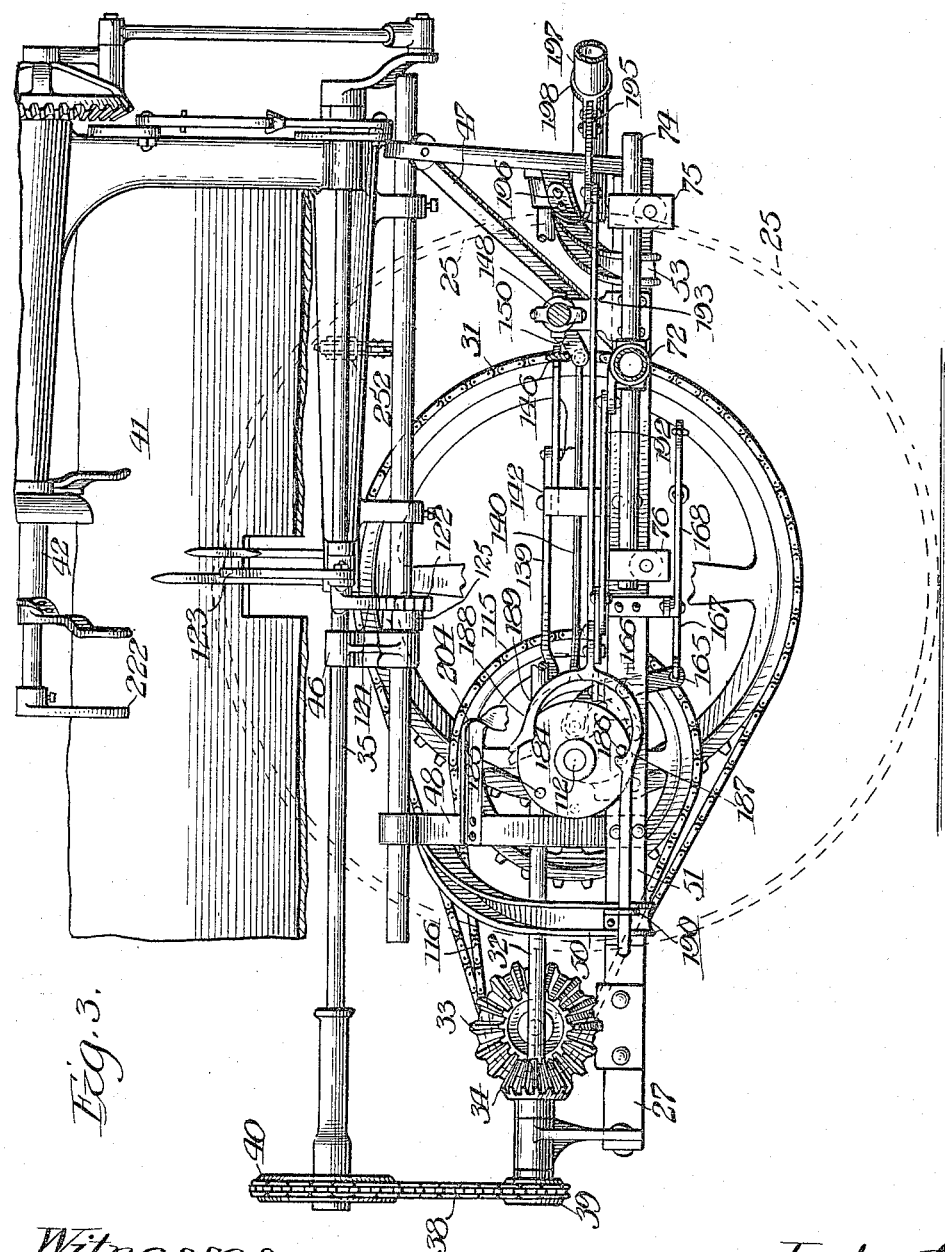

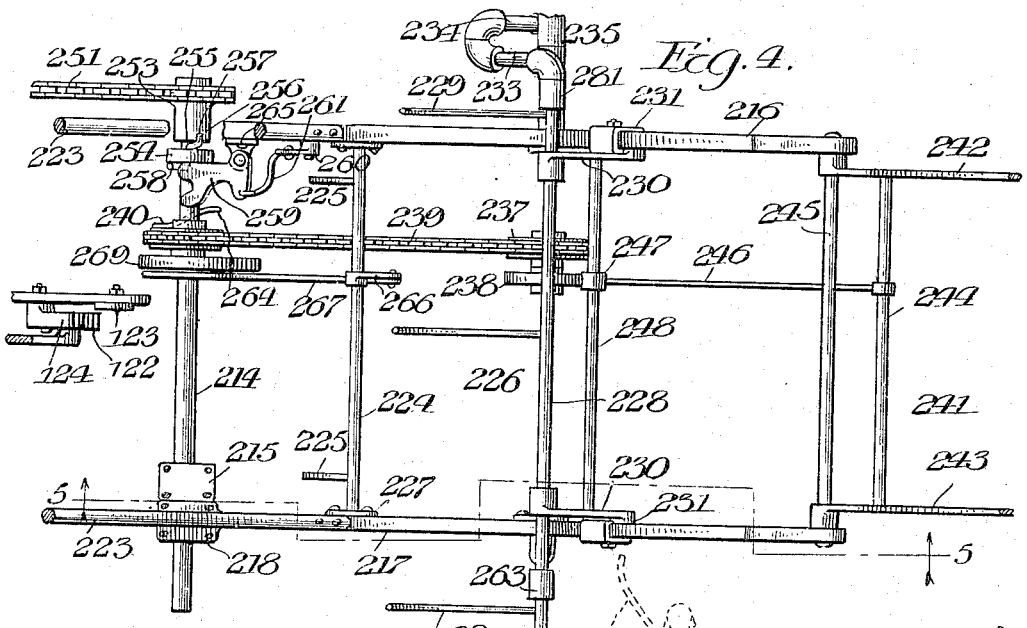
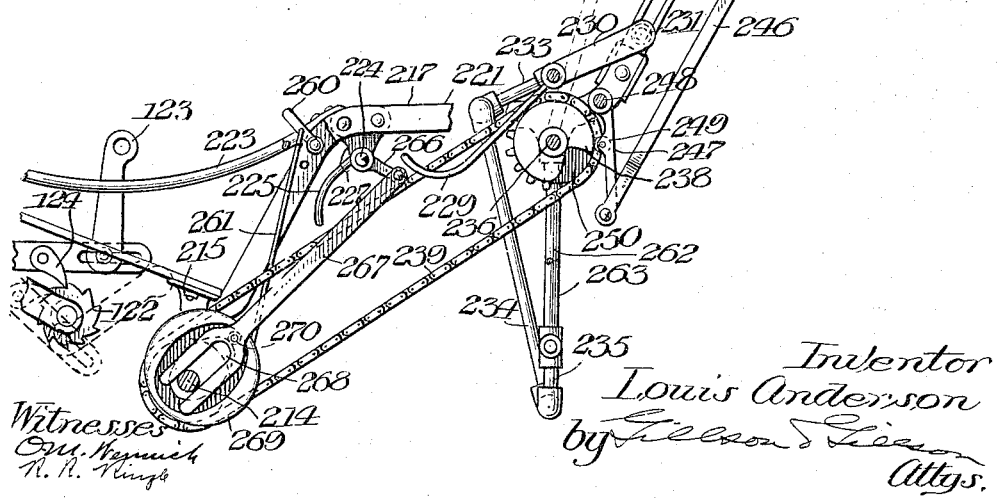

L. ANDERSON.
HARVESTING MACHINE.
APPLICATION FILED MAR. 13, 1914.
1,156,575.
Patented Oct. 12, 1915.
7 SHEETS—SHEET 5.
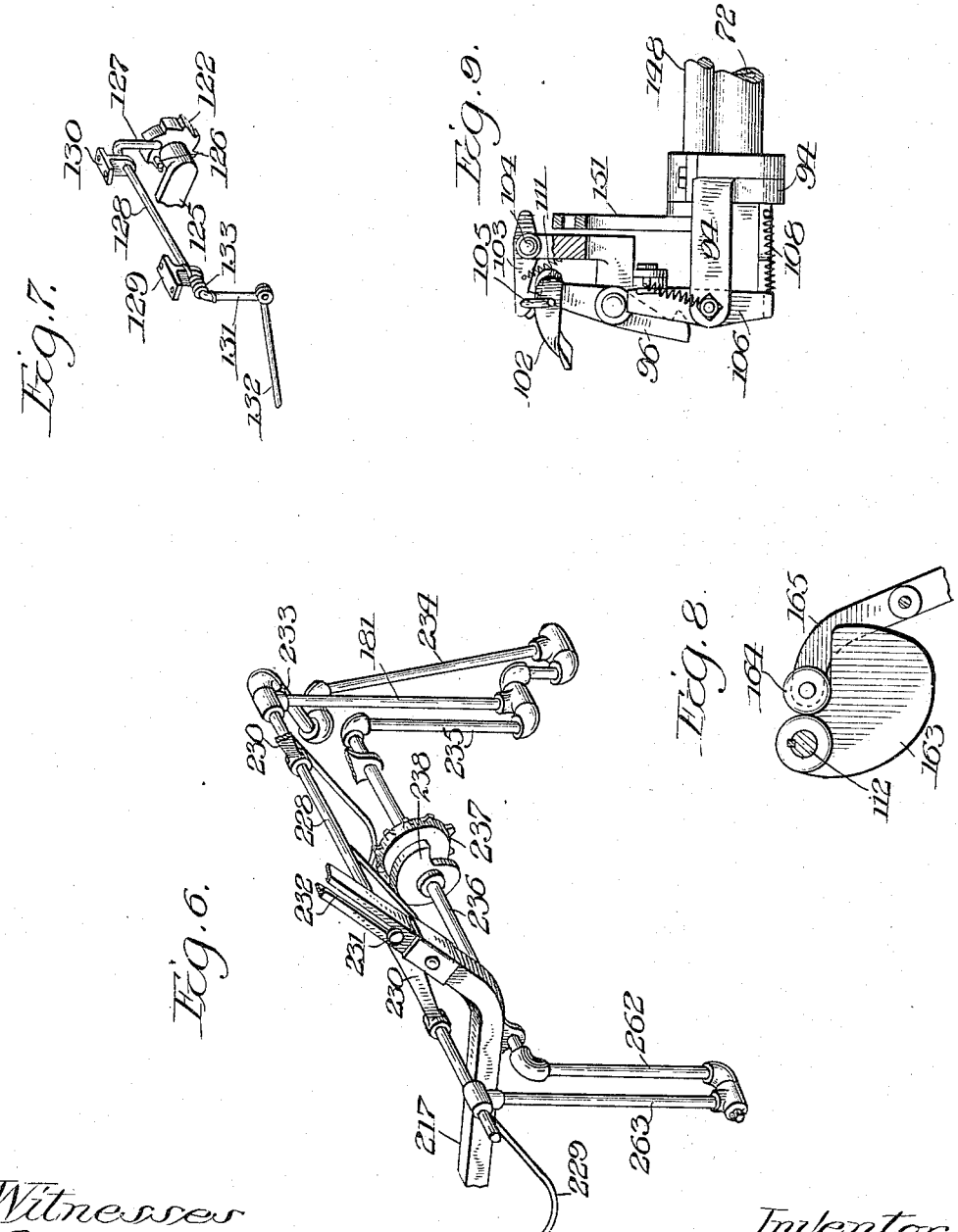

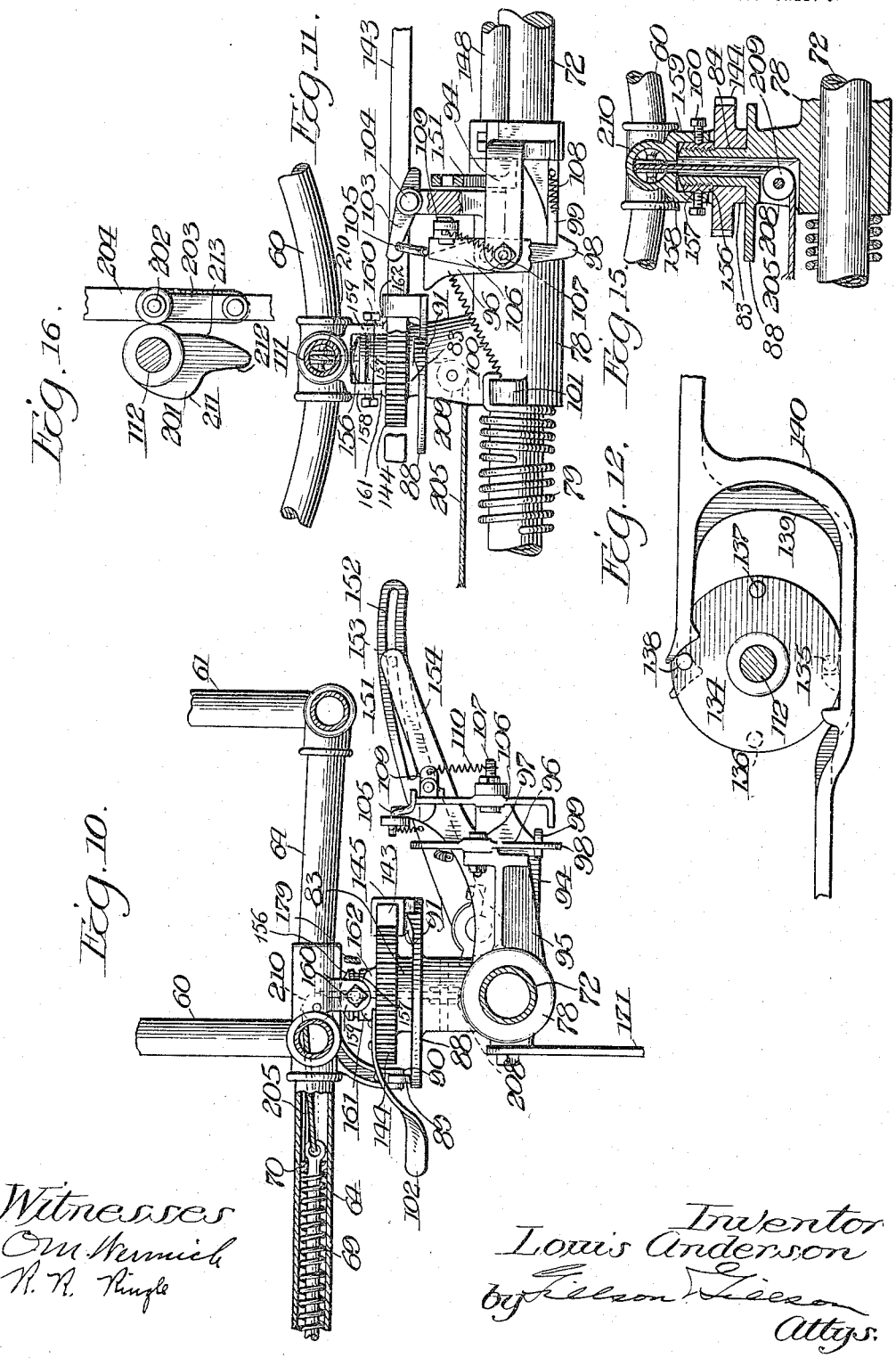

L. ANDERSON.
HARVESTING MACHINE.
APPLICATION FILED MAR. 13, 1914.

1,156,575.

Patented Oct. 12, 1915.
7 SHEETS—SHEET 7.

Witnesses
O. M. Heinrich
R. R. Ringle

Inventor
Louis Anderson
by Gillson & Gillson
attys.

UNITED STATES PATENT OFFICE.

LOUIS ANDERSON, OF CHICAGO, ILLINOIS.

HARVESTING-MACHINE.

1,156,575.  Specification of Letters Patent.  Patented Oct. 12, 1915.

Application filed March 13, 1914.  Serial No. 824,391.

*To all whom it may concern:*

Be it known that I, LOUIS ANDERSON, a citizen of the United States, and resident of Chicago, county of Cook, and State of Illinois, have invented certain new and useful Improvements in Harvesting-Machines, of which the following is a specification and which are illustrated in the accompanying drawings, forming a part thereof.

The invention relates to harvesting machines and more particularly to those in which provision is made for collecting the bundles of grain produced by the machine and depositing them upon the ground from time to time in the form of a shock.

The object of the invention is to provide a machine of the kind described which shall be of improved construction and effective in operation.

Figure 13:
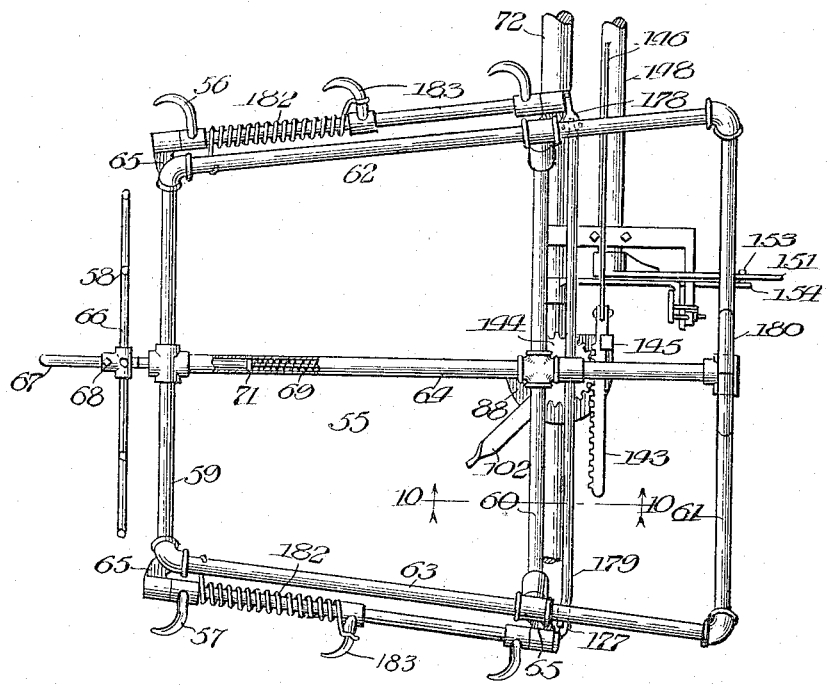
Figure 14:
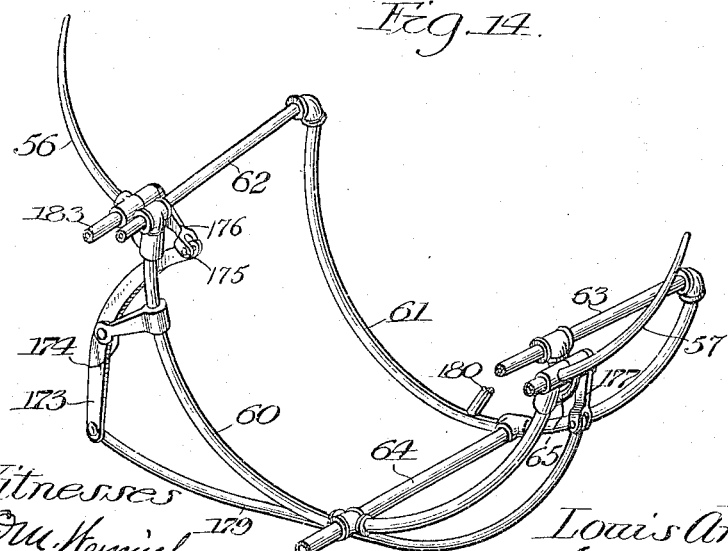

In the accompanying drawings, Figure 1 is a detail plan view of some of the operative parts of a harvesting machine embodying the features of improvement provided by the invention; Fig. 2 is a detail rear elevation of the same; Fig. 3 is a detail side elevation with some of the parts omitted, the connecting members which extend to the omitted parts being shown in section and the plane of such section being indicated by the line 3—3 of Fig. 1; Fig. 4 is a detail plan view of one form of mechanism which may be used for transmitting the bundles of grain from the binder mechanism to the shock forming mechanism; Fig. 5 is a detail side elevation of the mechanism shown in Fig. 4, some of the parts being broken away and others being shown in section on the plane indicated by the line 5—5 on Fig. 4; Fig. 6 is a detail perspective view of the mechanism shown in Figs. 4 and 5; Fig. 7 is a detail perspective view of a form of mechanism which may be used for determining the number of bundles in each shock; Fig. 8 is a detail side elevation showing a cam which may be used for compressing the shock; Fig. 9 is a detail front elevation showing the construction of certain latches which are used for controlling the shock forming mechanism; Fig. 10 is a detail sectional view taken on the line 10—10 of Fig. 13; Fig. 11 is similar to Fig. 9, but shows the parts in a different position; Fig. 12 is a detail sectional view taken on the line 12—12 of Fig. 1; Fig. 13 is a plan view of the shock forming mechanism; Fig. 14 is a perspective view showing a detail of the shock forming mechanism; Fig. 15 is a transverse sectional view taken centrally through the shock forming mechanism, and Fig. 16 is similar to Fig. 8, but shows a cam which may be used for pressing downwardly upon the shock when it has been deposited upon the ground.

The harvesting machine will preferably include mechanism for cutting the standing grain, tying the grain into bundles; for delivering the bundles to a shock forming cradle and for operating the cradle to deposit its load upon the ground in the form of a shock when a predetermined number of bundles of grain have been collected therein. The mechanism for cutting the standing grain and for tying it into bundles may take any of the forms which are now in common use. The mechanism for transferring the bundles of grain to a shock forming cradle and for operating the cradle will preferably be associated with a well known form of reaping and binding machine embodying these mechanisms. The bull wheel of such a machine is indicated in the drawings at 25. The more important parts of the frame work of the reaping and binding machine are represented by the longitudinal sills 26, 27, and the end sills 28 and 29. In the operation of the machine the parts are drawn over the ground in the direction indicated by the arrow on Fig. 1.

The main drive shaft of the reaping and binding machine is indicated at 30. This is operated from the bull wheel 25 by a sprocket chain 31. The longitudinal shaft usually provided for driving the sickle bar (not shown) is indicated at 32. This is operated from the main driving shaft 30, in a well known manner, as by beveled gears 33 and 34, one mounted on the main driving shaft 30 and the other on the longitudinal shaft 32. A second longitudinal shaft is shown at 35. This shaft is the one usually provided for operating the packers, as 36, 37. In the present instance it is continuously rotated whenever the machine is in operation. For that purpose it is conveniently driven from the longitudinal shaft 32. As shown, a sprocket chain 38 turns over a sprocket wheel 39, on the shaft 32 and over a sprocket wheel 40 on the shaft 35.

The usual inclined binder deck is indicated at 41. The knotter shaft 42 extends longitudinally over the deck 41 and the needle shaft 43 extends longitudinally beneath the deck. As is customary in reaper and binder mechanisms the needle shaft 43 is slidingly journaled to permit an adjustment of the same for tying grain of different lengths. As shown this shaft has a bearing intermediate its ends in a bracket 44. This bracket has a plate 45 formed upon one of its ends for securing the same to the under side of the deck 41. It also extends to and rotatably receives the shaft 35, as in the bearing 46. The shaft 43 is also journaled in stays 47 and 48. These stays are located adjacent the opposite ends of the shaft and both extend obliquely upward from the sill 27 and are rigidly attached thereto.

A rigid support for the mechanism which operates the shock forming cradle is conveniently secured by means of supplemental end sills 49 and 50 and a supplemental side sill 51. Each of the supplemental end sills 49 and 50 has a horizontal portion 52 (Fig. 2) and an inwardly and upwardly inclined portion 53, the two parts meeting at a sharp angle, as at 54. The two supplemental end sills are connected at their opposite ends to the main side sill 27 and to the oblique stays 47, 48 at the corresponding end of the machine. The supplemental side sill 51 rigidly connects the two supplemental end sills 49 and 50.

A cradle generally designated 55 serves for collecting the bundles of grain and depositing them upon the ground in the form of a shock. This cradle is desirably made in the shape of a trough having ends of unequal width. For receiving the bundles of grain it is desirably supported in a horizontal position with its wider end facing in the direction of travel of the machine. When the bundles are to be deposited upon the ground in the form of a shock, the cradle is at first turned end for end and is then tilted to an upright position. Hinged wings 56, 57, one of which is extended along each side of the trough, serve for compressing the contents of the cradle during the tilting of the same. If desired the cradle may also be provided with a plunger 58 for pressing downwardly upon the top of the shock to insure its being firmly placed upon the ground in an upright position.

The frame work of the cradle 55 conveniently comprises a plurality of curved transversely arranged tubes, as 59, 60 and 61 and two side and one intermediate longitudinal tubular members, as 62, 63 and 64. Brackets, as 65, secured to the transverse frame members 59, and 60 adjacent their outer ends, serve for hingedly supporting the wings 56 and 57. When a plunger, as 58, is used, it preferably comprises a forked head 66, for engaging the top of the shock, and a stem 67. The head 66 is supported beyond the smaller end of the cradle. For this purpose the stem 67 slidingly enters the bore of the intermediate tubular frame member 64. To permit the use of the plunger in connection with grain at different heights the head 66 is preferably adjustably mounted upon the stem 67, as by being secured thereto by a set screw 68. A spring 69, coiled about that part of the stem 67 of the plunger 58 which is inclosed by the member 64 and reacting between a stop 70 mounted within the bore of the member 64 and a shoulder 71 on the stem 67, serves for moving the plunger 58 in one direction.

The shock forming cradle 55 is preferably located beyond that side of the reaping and binding machine at which the bundles of grain are discharged. As shown, an arm 72 extends laterally outward from the side of the reaping and binding machine for supporting the cradle. Preferably the cradle is mounted upon the arm, intermediate its ends, and the outer end of the arm 72 is extended into the hub of a carrying wheel 73. To permit a relative backward movement of the cradle to compensate for the forward travel of the reaping and binding machine while the cradle deposits its load upon the ground, the inner end of the arm 72 is slidingly connected to the frame of the machine. As more clearly shown in Fig. 1, the inner end of the arm 72 is detachably secured to a longitudinally disposed sliding bar 74, as by a pin 77 which passes through the arm 72 and through a bracket 80 mounted on the bar. The bar 74 is slidingly supported in brackets 75, 76. These brackets 75 and 76 are desirably secured to a rigid part of the machine frame. As shown they are mounted upon the supplemental side sill 51. The turning of the bar 74 in the brackets 75 and 76 and the flexing of the joint between the inner end of the arm 72 and bracket 80 each permit the rising and falling of the outer end of the arm 72 incident to the travel of the carrying wheel 73 over uneven ground.

The cradle 55 is tilted by turning it about the arm 72. As shown a bracket 78 is rotatably mounted upon the arm for receiving the cradle. A spring 79 coiled about the arm 72 adjacent the bracket and having one end fixed in the arm and the other reacting against the bracket serves to cushion the tilting movement of the cradle and to assist in restoring it to a horizontal position.

To permit the cradle 55 being turned end for end it is rotatably mounted upon the bracket 78. As shown, an upstanding tubular pivot bolt 84 is secured in the bracket 78. The head 156 of this bolt is provided with a circumferential groove 157. The intermediate longitudinal frame member 64 of the cradle 55 is seated upon the head of the bolt and bracket lugs 158 and 159 depend from such frame member at opposite sides of the bolt. A set screw 160 is passed through each of the bracket lugs 158 and 159 and enters the groove 157. By this means the cradle 55 is so secured in place that it may be turned end for end and may also be rocked or tilted independently of the tilting movement imparted thereto by the turning of the bracket 78 about the arm 72.

For guiding the cradle while being turned end for end, a track plate 88 is preferably formed upon the bracket 78 about the bolt 84. When so constructed a roller 89 is provided to run upon this track plate during the turning of the cradle. As shown a base block 83 is rotatably mounted upon the pivot bolt 84 below the cradle and a bracket 90 is formed on the cradle for receiving the roller 89. In order that the base block 83 and cradle 55 shall turn together, lugs 161 and 162 are formed on the base block and enter the spaces between the bracket lugs 158 and 159 which are formed on the cradle.

If desired the track plate 88 may be provided with an elevated portion 91 on to which the roller 89 runs just as the reversal of the cradle is completed. This serves to rock the cradle upon the head 156 of the bolt 84 thereby giving it an initial tilting movement preparatory to its being tilted by the axial turning of the bracket 78 upon the arm 72. Mechanism both for locking the cradle against tilting while being turned and for locking it against turning while being tilted is desirably provided. As shown, a bracket arm 94 is rigidly mounted upon the arm 72, adjacent the rotatable bracket 78 and an arm 95 projects forwardly from the bracket 78. A latch 96 is pivoted at 97 upon the arm 95. This latch has a hooked lower end 98 for engaging against the under side of a lug 99 which projects laterally outward from the bracket 94. By this means the latch 96 normally serves to hold the cradle against tilting. A spring 100 having one end secured to the latch 96 adjacent its higher end and the other end secured to a lug 101 which projects forwardly from an adjacent part of the bracket 78 serves to yieldingly hold the latch 96 in hooked engagement with the lug 99.

A latch 103 serves for engaging the cam arm 102 to hold the cradle against turning while being tilted. As shown, the latch 103 is pivotally mounted upon the bracket 94 at 104. Normally the outer end of the latch 103 is supported in an elevated position out of the path of the cam arm 102. As shown, a prong, 105, projects forwardly and downwardly from the outer end of the latch 103 and normally rests upon the top of a swinging post 106. This swinging post is pivoted upon the bracket 94 intermediate its ends, as at 107. It is normally held in upright position beneath the prong 105 by a spring 108. This spring is more clearly shown in Fig. 9. It reacts between the lower end of the swinging post 106 and an adjacent part of the bracket 94. A vertically swinging pivoted arm 109 is mounted upon the post 106 adjacent its higher end and extends rearwardly therefrom. Its rearward end is normally held upon the same level with the cam arm 102, as by a spring 110. The spring 110 is most clearly shown in Fig. 10. It reacts between the forward end of the arm 109 and the bolt 107 which serves as a pivot for the post 106. During the turning of the cradle 55 and after engagement with the higher end of the latch arm 96, the cam arm 102 engages the rear end of the arm 109. The higher end of the post 106 is thereby moved inwardly and is withdrawn from beneath the prong 105. This permits the outer end of the latch 103 to fall into engagement with the cam arm 102 to hold the cradle against turning. Preferably a spring 111 reacts between the outer end of the latch 103 and an adjacent part of the bracket 94 to insure that the latch will be engaged with the cam arm 102 when the post 106 is moved from beneath the prong 105.

Upon the return of the cradle after being tilted the cam arm 102 engages the arm 109 from above. At this time the rear end of the arm 109 yields against the effort of the spring 110 and permits the cam arm to pass without swinging the post 106. The prong 105 is thereby engaged with the top of the post 106 and the downward movement of the latch 103 is arrested. The cam arm 102 is accordingly released and the latch arm 96 is permitted to reëngage with the lug 99.

A counter shaft 112 may be employed for communicating motion to the several parts to operate the cradle for discharging its load upon the ground when a predetermined number of bundles of grain have been collected therein. Preferably the parts are so proportioned that the counter shaft 112 is turned through one complete revolution for the formation of each shock and remains at rest while the bundles of grain are being collected in the cradle. As shown, this counter shaft is transversely mounted in the machine and is journaled at its opposite ends in bearing blocks 113 and 114. The bearing blocks are mounted upon the side sill 27 and upon the supplemental side sill 51, respectively.

When the counter shaft 112 is to be rotated, power is transmitted thereto from the drive shaft 30. For this purpose a sprocket wheel 115 is loosely mounted upon the inner end of the counter shaft 112 and a sprocket chain 116 turns over this sprocket wheel and over a sprocket wheel 117 which is fixed upon the drive shaft 30. The sprocket wheel 115 accordingly rotates continuously whenever the machine is in operation. Means are provided for rotatably connecting the sprocket wheel 115 with the counter shaft 112 when the latter is to be turned. For this purpose a collar 118 is fixed upon the shaft 112 adjacent the hub of the sprocket wheel 115 and a pin 119 extends through the collar. One end of the pin 119 extends over the hub of the sprocket wheel 115 and this hub is provided with a notch 120 for receiving the end of the pin when the counter shaft 112 is to be rotated. Normally the pin is held out of engagement with the notch 120 by the engagement of the outer end of the pin with a bell crank lever 121. If the bell crank lever 121 is temporarily drawn from engagement with the outer end of the pin 119, the inner end of the pin 119 will fall into engagement with the notch 120 in the hub of the sprocket wheel 115. The bell crank lever 121 being restored to its original position, the outer end of the pin 119 is again engaged with the bell crank lever when the counter shaft has been turned through one complete revolution, thereby raising the inner end of the pin out of engagement with the notch 120.

Preferably the movement of the bell crank lever 121 is controlled by a counting wheel 122 (Fig. 7). This counting wheel desirably takes the form of a ratchet. To permit the cradle 55 being operated to discharge its load upon the ground in the form of a shock when the number of bundles required for the formation of the shock have accumulated in the cradle, the counting wheel 122 is preferably turned through an angular distance corresponding to the spacing of its ratchet teeth at the completion of each bundle of grain by the bundle tying mechanism. As shown, a pawl 124 is mounted upon the grain stop 123 and coöperates with the ratchet teeth of the counting wheel 122 to turn the same. The grain stop 123 is otherwise of usual construction and is depressed when a sufficient quantity of grain for the formation of a bundle has been formed against it by the packers 36, 37. This depression of the grain stop sets the bundle tying mechanism in motion in the usual manner. When the completed bundle of grain is discharged from the deck, as 41, the grain stop 123 is again raised. When the grain stop 123 is depressed the pawl 124 is moved over the ratchet teeth of the counting wheel 122 to the position indicated by dotted lines in Fig. 5. When the grain stop 123 is again raised, the counting wheel 122 is rotated through an angular distance corresponding to the spacing or its ratchet teeth. Preferably the number of these ratchet teeth will be equal to the number of bundles of grain required to form a shock. The counting wheel will accordingly be turned through one complete revolution when this number of bundles has been produced.

In order that the counting wheel 122 may be in position for engagement by the pawl 124 at all times it is desirably so mounted as to be moved during the adjustment of the mechanism for tying grain of different lengths into bundles. As shown, the counting wheel is mounted upon a bracket 125. This bracket is rigidly secured to the rod 43 (Fig. 1) and projects outwardly therefrom.

A pin 126 (Fig. 7) carried by the counting wheel 122 coöperates with one of the crank arms, as 127 of a rock shaft 128 to withdraw the bell crank lever 121 from engagement with the pin 119, at each complete revolution of the counting wheel. As shown the rock shaft 128 is journaled in brackets 129 and 130 which are secured against the under side of the deck 41. Another crank arm, as 131, of the rock shaft 128 is connected with the bell crank lever 121 by a link 132. A spring 133 coiled about the rock shaft 128 and reacting between the bracket 129 and the crank arm 131 serves for rotating the rock shaft in the direction for returning the bell crank lever 121 to position for engagement with the pin 119 when the crank arm 127 is released by the pin 126.

A disk 134 mounted on the counter shaft 112 serves both for turning the cradle 55 end for end and for tilting and restoring the cradle. A pair of studs 135 and 136 project from the inner face of the disk 134 and act for turning the cradle end for end. A second pair of studs 137 and 138 project from the outer face of the disk and act for tilting and restoring the cradle. A bifurcated longitudinally movable pitman, as 139 and 140, is located at each side of the disk 134 for coöperating with the corresponding pair of studs. One arm of each of these bifurcated pitmen extends longitudinally beyond the counter shaft 112 and is slidingly supported upon the horizontal portion 52 of the supplemental end sill 50. At its forward end the pitman 139 is connected with one arm of a bell crank lever 141 (Fig. 1). This bell crank lever is pivotally supported to swing in a horizontal plane, as by being mounted upon a bracket 142 which is secured against the supplemental side sill 51.

The cradle 55 is turned end for end by the coöperation of a sliding rack 143 with gear teeth 144 formed about the rim of the block 83. As more clearly shown in Fig. 10, the rack 143 is slidingly mounted in a bracket 145 rigidly connected with the bracket 78 which turns upon the arm 72. A rod 146 extends between and connects the inner end of the rack bar 143 with one of the arms of the bell crank lever 141. Preferably the rod 146 is provided with a knuckle joint 147 intermediate its ends to permit the flexing of the rod incident to the tilting and restoring of the cradle, and to the raising and lowering of the cradle due to the travel of the carrying wheel 73 over uneven ground. Movement of the pitman 139 in one direction draws the rack bar 143 for turning the cradle to the left as viewed in Fig. 13. Movement of the pitman 139 in the opposite direction returns the cradle to its original position. In turning the shock end for end, the cradle is desirably turned to the left as viewed in Fig. 13, in order that the ends of the stalks, which contain the grain and which, if the stalks are long, may project to a considerable distance beyond, the smaller end of the cradle, shall be swung outwardly away from the reaping and binding machine.

A rock shaft 148 having one end journaled in a bearing block 149 carried by the supplemental side sill 51 and the other end journaled in the bracket 94 serves for communicating motion from the pitman 140 to the cradle 55. This rock shaft has crank arms 150 and 151 mounted upon its opposite ends. The crank arm 150 is connected with the pitman 140. The other crank arm, as 151, is slotted as indicated at 152, (Fig. 10). A pin 153 runs in the slot 152 for tilting and restoring the cradle. As shown the pin 153 is fixed upon an arm 154 which is formed rigidly with an projects forwardly from the arm 95. Movement of the pitman 140 in one direction serves to swing the rock shaft 148 and raise the arm 154 to tilt the cradle 55 backwardly by the turning of the bracket 78 upon the arm 72. Movement of the pitman 140 in the opposite direction swings the rock shaft 148 to return the cradle to a horizontal position. To permit the flexing of the parts incident to the travel of the carrying wheel 73, the rock shaft 148 is desirably provided with a knuckle joint 155 intermediate its ends. In the arrangement shown, the studs 137 and 138 are so positioned on the disk 134 to coöperate with the corresponding arms of the pitman 140 (Fig. 12), between the engagement of the studs 135 and 136 with the corresponding arms of the pitman 139. That is to say, the cradle is tilted and restored after being turned end for end and before being returned to its original position and all of these movements occur during a single rotation of the counter shaft 112.

A cam 163 serves to swing the wings 56, 57 inwardly over the contents of the cradle 55 while the cradle is being tilted to an upright position to deposit its load upon the ground. This cam is mounted upon the counter shaft 112 and turns with the shaft. It is illustrated in detail in Fig. 8. The cam coöperates with a cam roller 164 which is mounted upon the higher end of a vertically swinging lever 165. The lever 165 is pivoted intermediate its ends, as upon a bracket 166. The bracket 166 is conveniently carried by the supplemental side sill 51. A link 167 serves for connecting the lower end of the lever 165 to one of the arms of a bell crank lever 168 which turns in a horizontal plane. As shown, the bell crank lever 168 is pivotally supported upon a bracket 169 which projects outwardly from the supplemental side sill 51 (Fig. 1).

A link 170 operatively connects the bell crank lever 168 with a lever 171 which is centrally located beneath the cradle 55. As shown, the lever 171 is pivotally mounted upon the rotatable bracket 78 and projects downwardly therefrom (Fig. 2). Movement of the lever 171 is communicated to the wings 56, 57, of the cradle through a cord 172 and a bell crank lever 173. The bell crank lever 173 is pivotally mounted upon a bracket 174 which is fixed in position upon one of the transverse frame members, as 60, of the cradle 55. The cord 172 connects the lever 171 with one of the arms of the bell crank lever 173. As shown, the bell crank lever 173 is located at that side of the cradle which is nearest the reaping and binding machine when the cradle is in the bundle receiving position. The cord 172 therefore normally extends inwardly from the lever 171.

When the cradle 55 is turned end for end the cord 172 is swung to a position in which it extends outwardly from the lever 171. In this last mentioned position of the parts, inward movement of the lever 171 serves for drawing the lower end of the bell crank lever 173 inwardly toward the cradle. A pin 175 connects the higher end of the bell crank lever with a crank arm 176 which is rigidly secured to and swings with the wing 56. A pulling movement of the link 170 accordingly serves to swing the wing 56 inwardly over the contents of the cradle. For obtaining a simultaneous movement of the wing 57, each wing is provided with a rigid crank arm, as 177, 176, and these crank arms are connected, as by a link 179 which extends from the lever 173 to the crank arm 177. The link 179 is curved to extend about the contents of the cradle and substantially conforms in shape with transverse frame members, as 59, 60, and 61 of the cradle.

Outward movement of the wings 56 and 57 is conveniently accomplished by means of springs. As shown, a spring 182 is coiled about the pivotal cross arm of each of the wings and reacts between an adjacent part of the cradle, as the longitudinal frame member 62 or 63, and one of the arms, as 183 of the corresponding wing. Preferably the cam 163 is of such shape and is so positioned on the counter shaft 112 with reference to the position of the studs 135, 136, 137 and 138 upon the disk 134 as to operate the lever 165 for swinging the wings 56 and 57 inwardly while the cradle 55 is being tilted to an upright position and to release the lever 165 in order that the wings 56 and 57 may be opened by their respective springs 182 immediately after the cradle has reached an upright position whereby its load is deposited upon the ground in the form of a shock.

A disk 184, mounted upon the counter shaft 112 adjacent the outer end of the same, serves for moving the arm 72 rearwardly to temporarily compensate for the forward travel of the machine when the bundle of grain in the cradle 55 first becomes engaged with the ground in the form of a shock and for returning the arm to its normal position when the shock has been released by the cradle, as by the opening of the wings 56, 57, and the raising of the plunger 58. As shown, a pair of studs 185 and 186 are mounted upon the disk 184 and project outwardly therefrom. During the rotation of the disk these studs coöperate respectively with the two arms as 187 and 188 of the bifurcated pitman 189. One of the arms, as 187 of the pitman 189 is extended in rear of the counter shaft 112 and is slidingly supported, as in a bracket 190 which is secured to and extends outwardly from the supplemental rear end sill 50. At its forward end the pitman 189 is operatively connected with a lever 191 which swings in a horizontal plane. The lever 191 is pivotally mounted upon a fixed part of the frame, as the bracket 166 (Fig. 1). In the normal position of the lever 191 it extends obliquely forward and outward from the bracket 166. Two links 192 and 193 are connected with the lever 191 and extend forwardly therefrom.

During the swinging of the lever 191, the links 192 and 193 serve to impart a backward and forward movement to the arm 72 at its inner and outer ends respectively. As shown, the forward end of the link 192 is pivotally connected with a collar 194 which is fixed upon the arm 72 adjacent its inner end. The forward end of the link 193 is connected with a lever 195. This lever is pivotally mounted upon a fixed part of the machine frame, as a bracket 196. The bracket 196 is secured to and extends obliquely outward from the inclined portion 53 of the supplemental front end sill 49. A swinging arm 197 serves for communicating motion from the lever 195 to the outer end of the arm 72. The arm 197 is pivotally mounted upon the main frame of the reaping and binding machine, as at 198 (Fig. 1). This arm and the lever 195 are operatively connected, as by means of a band 198' which surrounds the arm 197 and has its ends pivotally secured to the lever 195 by means of a pin 199 which extends through the ends of the band and through the lever 195. A link 200 extends obliquely between and operatively connects the arms 72 and 197 at their outer ends.

Preferably the studs 185 and 186 are so positioned upon the disk 184 with reference to the positions of the stud 138 upon the disk 134 and of the cam 163 upon the countershaft 112 as to operate the pitman 189 to draw the arm 72 rearwardly immediately as the cradle 55 reaches an upright position with its load in engagement with the ground, and to move the arm 72 forwardly when the cam 163 has released the lever 165 to permit of the wings 56 and 57 being opened by the springs 182.

In some instances it may be desirable to compress the shock downwardly when it has been deposited upon the ground. For this purpose the forked head 66 of the plunger 58 is engaged with the top of the shock, and the plunger 58 is given a downward movement against the effort of the spring 69 when the cradle 55 has been turned to an upright position. To insure the shock remaining in upright position when it is released from the cradle 55, it has been found desirable to give the plunger 58 an initial downward movement to slightly press downward upon the top of the shock when the cradle 55 first reaches an upright position, and to give the plunger 58 a further downward movement to exert a final compressing action upon the shock just as the wings 56 and 57 are opened for releasing the shock.

A cam, as 201 (Fig. 16) may be employed for imparting the desired downward movements to the plunger 58. As shown, this cam is mounted upon the countershaft 112 adjacent to but inside of the disk 134 (Fig. 1). A roller 202 mounted upon one end of a lever 203 coöperates with the cam 201 during the rotation of the counter shaft 112. The lever 203 is pivotally supported in any convenient manner as upon the lower end of a bracket arm 204 which projects obliquely downward and forward from the inclined member 48 of the supplemental rear end sill 50. A flexible cable 205 serves for communicating motion from the lever 203 to the plunger 58. As shown, the cable 205 has one end attached to the lever 203. It extends forwardly from the lever and turns first about a guide roller 206. The guide roller is mounted upon a bracket 207 which is secured to and extends rearwardly from the horizontal portion 52 of the supplemental front end sill 49.

From the guide roller 206 the cable 205 extends outwardly adjacent to and substantially parallel with the arm 72 and enters an opening 208 (Fig. 15), in the bracket 78 below the lower end of the tubular pivot bolt 84. At this point the cable 205 turns about a guide roller 209 which is mounted upon the bracket 78 within the opening 208. From the guide roller 209 the cable 205 extends upwardly through the bore of the pivot bolt 84 and thence outwardly through the bore of the intermediate longitudinal frame member 64 of the cradle 55 where it is joined to the stem 67 of the plunger 58. In passing from the bore of the tubular pivot bolt 84 into the bore of the tubular frame member 60 the cable 205 preferably turns over a guide roller 210 which is mounted in the wall of the said tubular frame member.

The cam 201 desirably provided with two oblique portions, as 211 and 212 upon its rim (Fig. 16). The oblique portion 211 serves for swinging the lever 203 to impart an initial downward movement to the plunger 58, as when the cradle 55 is first turned to an upright position. The oblique portion 212 of the cam 201 serves for imparting a further movement to the lever 203 for exerting a final compression upon the top of the shock just as the same is released, as by the opening of the wings 56 and 57. When a reduced portion, as 213, of the cam 201 is presented toward the roller 202, the cable 205 is released and the plunger 58 is raised by the spring 69 (Fig. 13). A V-shaped projection 180 which is rigidly mounted upon the transverse frame member 61 of the cradle 55 and extends inwardly therefrom serves for spreading out that part of the contents of the cradle which constitutes the base of the shock and thereby gives to the shock a form whereby it assumes a stable position when placed upon the ground.

The mechanism which is preferably used for transferring the bundles of grain from the bundle tying mechanism of the reaping and binding machine to the cradle 55 is illustrated in Figs. 2, 4, 5, and 6. For operating this mechanism a counter shaft 214 (Fig. 4) is provided. This counter shaft desirably extends parallel with and directly below the outer edge of the deck 41. As shown, it is journaled in brackets, as 215, which are secured to the under side of the deck. Front and rear frame members 216 and 217 extend outwardly and upwardly from the outer edge of the deck for supporting the mechanism. Each of these frame members is secured to the deck by means of foot plates, as 218, and comprises inclined end portions 219 and 220 and an intermediate horizontal portion 221. An ejector arm, as 222 (Fig. 2) of the bundle tying mechanism serves for delivering the bundles of grain upon the intermediate horizontal portions 221 of the frame members 216 and 217. For this purpose, curved guide strips, as 223 extend between the deck 41 and the inner ends of the intermediate horizontal portions 221 of the frame members 216 and 217.

A rock shaft 224 having a plurality of crank arms, as 225, for engaging the bundle, serves for advancing the bundle upon the horizontal portions, as 221 of the frame members 216 and 217. A carrier generally designated 226 serves for raising the bundle over the higher ends of the outer oblique portions 220 of the frame members 216 and 217. The rock shaft 224 extends horizontally between the frame members 216 and 217. It is journaled adjacent its opposite ends in brackets, as 227 each of which is secured against the under side of the corresponding frame member 216 or 217.

The carrier 226 conveniently takes the form of a fork comprising a cross arm 228 and a plurality of curved tines, as 229. The tines 229 are secured to and extend rearwardly from the cross arm 228. A bracket 230 is mounted on the cross arm 228 of the fork 226 adjacent each of its ends and carries a stud, as 231. Each of these studs runs in a guide groove, as 232 (Fig. 6) which extends substantially throughout the length of the outer oblique portions 220 of the corresponding frame member 216 or 217. A crank arm 233 (Fig. 4) is mounted upon the cross arm 228 of the carrier 226 adjacent one end of the arm. A link 234 connects this crank arm with a crank 235 which is mounted upon the adjacent end of a crank shaft 236. The crank shaft 236 extends horizontally between and is journaled adjacent its opposite ends in the frame members 216 and 217. A link 181 connects an intermediate part of the crank arm 235 directly with the cross arm 228 of the carrier 226. A similar link 263, located adjacent the other end of the carrier 226, connects the cross arm 228 with another crank arm 262 of the crank shaft 236.

In addition to the crank arms 235 and 262 which are mounted upon its opposite ends, the crank shaft 236 carries a sprocket wheel 237 and a cam 238. A sprocket chain 239 turns over the sprocket wheel 237 and over a driving sprocket 240 which is mounted upon the counter shaft 214. Preferably the sprocket wheels 237 and 240 are of the same size. The turning of the counter shaft 214 through one revolution accordingly causes the crank shaft 236 to make one complete revolution. By this means the carrier 226 is raised to the position illustrated by dotted lines in Fig. 5, and returns to the position indicated in Figs. 2, 4 and 6 and by full lines in Fig. 5. The connection of the outer end of the crank arm 235 with the crank arm 233 by the link 234 serves to swing the carrier upwardly and outwardly while being raised.

A tilting fork generally designated 241 and located adjacent the higher ends of the frame members 216 and 217 serves for discharging the bundles of grain into the cradle 55. This fork comprises a pair of curved arms 242 and 243 and a cross tie 244 which extends between and connects the arms. Each of the arms 242 and 243 is pivotally mounted upon a cross tie 245, which extends between and connects the frame members 216 and 217 at their higher ends.

The cam 238 (Figs. 4 and 5) serves for operating the fork 241. For this purpose a link 246 connects the cross tie 244 of the fork 241 with a lever 247. The lever 247 is pivotally supported in front of the cam 238. As shown it is hung upon a cross tie 248 which extends between and connects the frame members 216 and 217 adjacent the lower ends of their outer oblique portions 220. A roller 249 which is mounted upon the lever 247 intermediate its ends runs upon the rim of the cam 238.

Referring more particularly to Fig. 5 the greater portion of the rim of the cam 238 is circular. So long as the roller 249 runs upon this circular portion of the rim of the cam the tilting fork is supported in the position illustrated by full lines. When, however, a depression, as 250, in the rim of the cam 238 is presented to the roller 249 the fork 241 is permitted to tilt downwardly to the position illustrated by dotted lines for discharging a bundle of grain into the cradle 55. A further turning of the cam 238 returns the fork 241 to the position illustrated by full lines.

Most desirably the counter shaft 214 is operated only when a bundle of grain is to be transferred from the bundle tying mechanism to the cradle. Power for this purpose is conveniently derived from the packer shaft 35 (Fig. 2). As shown, a sprocket chain 251 turns over a sprocket wheel 252 which is fixed upon the packer shaft and over a sprocket wheel 253 which is normally loose upon the counter shaft 214.

Clutch mechanism, more particularly illustrated in Fig. 4, and similar to that provided for controlling the rotation of the counter-shaft 112 (Fig. 1) serves for rotatably connecting the sprocket wheel 253 and counter shaft 214, when the latter is to be operated. As shown, a disk 254 is fixed upon the counter shaft 214 adjacent the hub of the sprocket wheel 253. A pin 255 extends through the disk 254 and has a crank arm 256 upon its outer end for entering a notch 257 in the hub of the sprocket wheel 253. The crank arm 256 is normally held out of engagement with the notch 257. For this purpose, a crank arm 258 is formed upon that end of the pin 255 which is remote from the crank arm 256. The crank arm 258 is normally engaged with one of the arms of a bell crank 259. This bell crank is pivotally mounted upon a bracket 265 which is secured against an adjacent part of the frame member 216 (Fig. 4).

When the counter shaft 214 is to be rotated the bell crank lever 259 is withdrawn from engagement with the crank arm 258 of the pin 255. For this purpose a trigger 260 is provided. This trigger extends into the path which is traversed by a bundle of grain as it is delivered upon the horizontal intermediate portions 221 of the frame members 216 and 217 by the ejector arm 222. As most clearly shown in Figs. 4 and 5 the trigger 260 is pivotally secured against the inside face of the upwardly inclined portion 219 of the frame member 216. A link 261 extends between and connects the trigger 260 with one of the arms of the bell crank lever 259. Engagement of a bundle of grain with the trigger 260 as it is delivered from the horizontal intermediate portions 221 of the frame members 216 and 217 serves to withdraw the bell crank lever 259 from engagement with the crank arm 258 of the pin 255 and permit the crank arm 256 of such pin to enter the notch 257 in the hub of the sprocket wheel 253 for rotatably connecting the sprocket wheel and the counter shaft 214. If the bell crank lever be returned to its original position before the counter shaft 214 has turned through one complete revolution, its motion will be arrested when such revolution is completed by the reëngagement of the crank arm 258 with the bell crank lever. Preferably provision is made for adjustably positioning the trigger 260 upon the upwardly inclined portion 219 of the frame member 216 (Fig. 5) to insure that the rock shaft 224 will be operated to cause the arms 225 to engage the bundle of grain before it is released by the ejector arm 222. A cam finger 264 (Fig. 4) secured against the side of the sprocket wheel 240, engages the bell crank 259 during the turning of the sprocket wheel, for returning the bell crank to position of engagement with the crank arm 258 of the pin 255 and for raising the trigger 260.

Any convenient mechanism may be employed for turning the rock shaft 224 for causing its crank arms, as 225 to engage the bundle of grain to advance it upon the horizontal portions, as 221, of the frame members 216 and 217. In order that the movement of these crank arms may be properly timed for engaging the bundle as it is released by the ejector arm 222 (Fig. 2), this mechanism is desirably operated from the counter shaft 214. As shown, a crank arm 266 is mounted on the rock shaft 224 intermediate its ends. A link 267 (Fig. 5) has one end connected with the crank arm 266. The other end of the link 267 is bifurcated, as at 268 to slidingly receive the counter shaft 214. A cam 269 is mounted on the counter shaft 214 adjacent the link 267 and operatively engages a cam roller 270 mounted on the link.

The operation of the machine may be briefly described as follows:—Bundles of grain are formed upon the deck 41 (Fig. 2) in the usual manner. As each bundle of grain is completed it is advanced along the guide strips 223 by the ejector arm 222. As it passes the trigger 260 this is depressed by the engagement therewith of the bundle and the bell crank 259 is withdrawn from beneath the crank arm 258 of the pin 255. This permits the pin to rotate in the disk 254 and its crank 256 falls into the notch 257 in the hub of the sprocket wheel 253.

The counter shaft 214 is now rotated with the sprocket wheel 253 through one complete revolution. During this revolution of the counter shaft 214, the cam finger 264 engages the bell crank 259 to restore this bell crank to position for engaging the crank arm 258 of the pin 255, this movement of the bell crank also serving to restore the trigger 260. The crank arm 256 of the pin 255 is accordingly lifted out of engagement with the notch 257 in the hub of the sprocket wheel 253 when the counter shaft 214 has been turned through one complete revolution.

During the initial movement of the counter shaft 214 the rock shaft 224 is rotated to raise the crank arms 225 into engagement with the bundle of grain and advance it upon the horizontal portions, as 221 of the frame members 216 and 217. By the time the bundle has reached a position which is above the tines 229 of the carrier 226, the crank shaft 236 will have been rotated through a sufficient distance to cause the carrier to be raised by the operation of the crank arms 235 and 262, the links 181 and 263 and the link 234 and crank arm 233 (Fig. 6). The bundle is thereby raised over the higher ends of the oblique portions 220 of the frame members 216 and 217. As the bundle falls from this position it is guided into the cradle 55 by the operation of the tilting fork 241. That is to say, as the bundle of grain comes into engagement with the arms 242 and 243 (Fig. 4) of the fork 241, this fork is permitted to fall to the position indicated by dotted lines in Fig. 5 by reason of the fact that the depressed portion 250 in the rim of the cam 238 is presented to the cam roller 249.

When a predetermined number of bundles have accumulated in the cradle 55 it is turned end for end and tilted to discharge its load upon the ground by the operation of the counter shaft 112, all as heretofore described. This number of bundles is determined by the number of teeth in the counting wheel 122 (Figs. 2 and 7), each depression of the grain stop 123 serving to turn the counting wheel through an angular distance which corresponds to the spacing of its ratchet teeth, and the pin 126 on the guiding wheel 122 serving to operate the clutch which controls the movement of the counter shaft 112 at each revolution of the counting wheel.

Each of the bifurcated pitmen 139, 140 and 189 is so formed that its two arms, as 187, 188, lie in different planes. The two pins, as 135, 136, 137, 138 and 185, 186, are then made of different lengths to permit the shorter pin, as 135, 136 and 185 to pass one of the arms of the corresponding pitman.

I claim as my invention,—

1. In a harvesting machine, in combination, a traveling frame, a trough shaped shock former carried by the frame and normally occupying a horizontal bundle collecting position, means for turning the shock former to an upright position for the discharge of its load through its top by the forward travel of the frame with the contents of the shock former engaged with the ground and a shock compressing plunger carried by the shock former and movable downwardly thereon when the shock former has been turned to an upright position.

2. In a harvesting machine, in combination, a traveling frame, a trough shaped shock former carried by the frame and normally occupying a horizontal bundle collecting position, means for turning the shock former to an upright position for the discharge of its load through its top by the forward travel of the frame with the contents of the shock former engaged with the ground, a shock compressing plunger carried by the shock former and movable downwardly thereon when the shock former has been turned to an upright position, and means for moving the shock former backwardly with respect to the frame to temporarily compensate for the forward travel of the frame during the operation of the said shock compressing plunger.

3. In a harvesting machine, in combination, a traveling frame, a trough shaped shock former carried by the frame and normally occupying a horizontal bundle collecting position, means for turning the shock former to an upright position for the discharge of its load through its top by the forward travel of the frame with the contents of the shock former engaged with the ground, wings movable laterally over the shock former for compressing its contents during the said turning of the shock former and a shock compressing plunger carried by the shock former and movable downwardly thereon when the shock former has been turned to an upright position.

4. In a harvesting machine, in combination, a traveling frame, a trough shaped shock former carried by the frame and normally occupying a horizontal bundle collecting position, means for turning the shock former to an upright position for the discharge of its load through its top by the forward travel of the frame with the contents of the shock former engaged with the ground, wings movable laterally over the shock former for compressing its contents during the said turning of the shock former, a shock compressing plunger carried by the shock former and movable downwardly thereon when the shock former has been turned to an upright position and means for moving the shock former backwardly with respect to the frame to temporarily compensate for the forward travel of the frame during the operation of the said shock compressing plunger.

5. In a harvesting machine, in combination, a traveling frame, a trough shaped shock former carried by the frame and normally occupying a horizontal bundle collecting position, means for turning the shock former to an upright position for the discharge of its load through its top by the forward travel of the frame with the contents of the shock former engaged with the ground, means acting to laterally compress the contents of the shock former during the said turning of the same and means acting to press downwardly upon the end of the contents of the shock former when the same has been turned to the said upright position.

6. In a harvesting machine, in combination, a traveling frame, a trough shaped shock former carried by the frame and normally occupying a horizontal bundle collecting position, means for turning the shock former to an upright position for the discharge of its load through its top by the forward travel of the frame with the contents of the shock former engaged with the ground, means acting to laterally compress the contents of the shock former during the said turning of the same, means acting to press downwardly upon the end of the contents of the shock former when the same has been turned to the said upright position, and means for moving the shock former backwardly with respect to the frame to temporarily compensate for the forward travel of the frame during the operation of the said means which acts to press downwardly upon the end of the contents of the shock former.

7. In a harvesting machine, in combination, a traveling frame, a trough shaped shock former carried by the frame and normally occupying a horizontal bundle collecting position, means for turning the shock former to an upright position for the discharge of its load through its top by the forward travel of the frame with the contents of the shock former engaged with the ground and means acting to press downwardly upon the end of the contents of the shock former when the same has been turned to the said upright position.

8. In a harvesting machine, in combination, a traveling frame, a trough shaped shock former carried by the frame and normally occupying a horizontal bundle collecting position, means for turning the shock former to an upright position for the discharge of its load through its top by the forward travel of the frame with the contents of the shock former engaged with the ground, means acting to press downwardly upon the end of the contents of the shock former when the same has been turned to the said upright position and means for moving the shock former backwardly with respect to the frame to temporarily compensate for the forward travel of the frame during the operation of the said means which acts to press downwardly upon the end of the contents of the shock former.

9. In a harvesting machine, in combination, a traveling frame, a trough shaped shock former carried by the frame and normally occupying a horizontal bundle collecting position, means acting successively to turn the shock former end for end in a horizontal plane and to turn the shock former to an upright position for the discharge of its load through its top with the contents of the shock former engaged with the ground and means acting to press downwardly upon the end of the contents of the shock former when the same has been turned to the said upright position.

10. In a harvesting machine, in combination, a traveling frame, a trough shaped shock former carried by the frame and normally occupying a horizontal bundle collecting position, means acting successively to turn the shock former end for end in a horizontal plane and to turn the shock former to an upright position for the discharge of its load through its top with the contents of the shock former engaged with the ground, means acting to laterally compress the contents of the shock former during the said turning of the same to an upright position, and means acting to press downwardly upon the end of the contents of the shock former when the same has been turned to the said upright position.

11. In a harvesting machine, in combination, a traveling frame, a trough shaped shock former carried by the frame and normally occupying a horizontal bundle collecting position, means acting successively to turn the shock former end for end in a horizontal plane and to turn the shock former to an upright position for the discharge of its load through its top with the contents of the shock former engaged with the ground, means acting to press downwardly upon the end of the contents of the shock former when the same has been turned to the said upright position, and means for moving the shock former backwardly with respect to the frame to temporarily compensate for the forward travel of the frame during the operation of the said means which acts to press downwardly upon the end of the contents of the shock former.

12. In a harvesting machine, in combination, a traveling frame, a trough shaped shock former carried by the frame and normally occupying a horizontal bundle collecting position, means acting successively to turn the shock former end for end in a horizontal plane and to turn the shock former to an upright position for the discharge of its load through its top with the contents of the shock former engaged with the ground, means acting to laterally compress the contents of the shock former during the said turning of the same to an upright position, means acting to press downwardly upon the end of the contents of the shock former when the same has been turned to the said upright position, and means for moving the shock former backwardly with respect to the frame to temporarily compensate for the forward travel of the frame during the operation of the said means which acts to press downwardly upon the end of the contents of the shock former.

13. In a shock former, in combination, a trough shaped bundle collector, a compressing plunger carried by the collector and movable longitudinally with respect thereto, a normally upright tubular stud rotatably supporting the collector, means for turning the collector on the stud, means for tilting the stud to turn the collector to an upright position and a flexible pull cord extending through the bore of the stud and connected to the said plunger.

14. In combination, a traveling harvesting frame, an arm extending horizontally outward at one side of the frame, a collar rotatably mounted on the arm, a tubular stud having a lateral opening carried by the collar and normally occupying an upright position, a trough shaped bundle collector rotatably mounted on the stud, a plunger carried by the collector and movable longitudinally with respect thereto, means for turning the collector on the stud, means for turning the collar on the arm for tilting the collector and a pull cord entering the bore of the stud through its said lateral opening and connected to the said plunger.

15. In combination, a traveling harvester frame, an arm extending horizontally outward at one side of the frame, a collar rotatably mounted on the arm, a tubular stud having a lateral opening carried by the collar and normally occupying an upright position, a trough shaped bundle collector rotatably mounted on the stud, a plunger carried by the collector and movable longitudinally with respect thereto, a cord entering the bore of the stud through its said lateral opening and connected to the plunger, means acting successively for rotating the collector on the stud to turn the collector end for end, for turning the collar on the arm to tilt the cradle to an upright position and for pulling on the cord to depress the plunger.

16. In combination, a traveling harvester frame, an arm extending horizontally outward at one side of the frame, a collar rotatably mounted on the arm, a tubular stud having a lateral opening carried by the collar and normally occupying an upright position, a trough shaped bundle collector rotatably mounted on the stud, a plunger carried by the collector and movable longitudinally with respect thereto, inwardly movable wings hingedly mounted upon the sides of the collector, a cord entering the bore of the stud through its said lateral opening and connected to the plunger, means for rotating the collector on the said stud to turn the collector end for end, means operable only when the collector has been turned end for end for moving the wings and means acting to turn the collar on the arm for tilting the collector to an upright position and for pulling on the cord to depress the plunger.

17. In combination, a traveling harvester frame, an arm extending horizontally outward at one side of the frame, a collar rotatably mounted on the arm, a tubular stud having a lateral opening carried by the collar and normally occupying an upright position, a trough shaped bundle collector rotatably mounted on the stud and constructed to discharge its load through its top by the forward travel of the harvester frame when tilted to an upright position with an end of its load engaged with the ground, a plunger carried by the collector and movable longitudinally with respect thereto, a cord entering the bore of the stud through its said lateral opening and connected to the plunger, means acting successively for rotating the collector on the stud to turn the collector end for end and for turning the collar on the arm to tilt the collector to the said upright position and means acting when the collector has been tilted to an upright position to move the said arm horizontally backward with respect to the harvester frame to temporarily compensate for the forward travel of the frame and for pulling upon the cord to depress the said plunger.

18. In combination, a traveling harvester frame, an arm extending horizontally outward at one side of the frame, a collar rotatably mounted on the arm, a tubular stud having a lateral opening carried by the collar and normally occupying an upright position, a trough shaped bundle collector rotatably mounted on the stud and constructed to discharge its load through its top by the forward travel of the harvester frame when tilted to an upright position with an end of its load engaged with the ground, a plunger carried by the collector and movable longitudinally with respect thereto, a cord entering the bore of the stud through its said lateral opening and connected to the plunger, inwardly movable wings hingedly mounted upon the sides of the collector, means acting successively for rotating the collector on the stud to turn the collector end for end and for rotating the collar on the arm to tilt the collector to the said upright position, means acting to move the wings during the tilting of the collector and to release the wings when the collector reaches an upright position and means acting when the collector has been tilted to an upright position to move the said arm horizontally backward with respect to the harvester frame to temporarily compensate for the forward travel of the frame and for pulling upon the cord to depress the said plunger.

19. In combination, a traveling harvester frame, an arm extending horizontally outward at one side of the frame, a collar rotatably mounted on the arm, a stud carried by the collar and normally occupying an upright position, a trough shaped bundle collector loosely mounted on the stud, means for rotating the collector on the stud to turn the collector end for end, means acting to tilt the collector on the stud during the said turning of the collector and means for rotating the collar on the arm to tilt the collector to an upright position when it has been turned end for end and tilted on the stud.

20. In a harvesting machine, in combination, bundle forming mechanism including an ejector, a bundle collector located at one side of the bundle forming mechanism, a reciprocating bundle carrier receiving bundles from the said ejector and traveling in a straight line laterally upward therefrom for discharging bundles into the collector, mechanism for driving the carrier including a clutch, a trigger located in the path of the bundles delivered by the ejector and connection between the trigger and the said clutch.

21. In a harvesting machine, in combination, bundle forming mechanism including a deck on which the bundles are tied, a bundle collecting and shock forming cradle located at one side of the deck, parallel arms extending outwardly and upwardly from the said side of the deck over the adjacent side of the cradle and a reciprocating carrier sliding in the arms.

22. In a harvesting machine, in combination, bundle forming mechanism including a deck on which the bundles are tied, a bundle collecting and shock forming cradle located at one side of the deck, parallel arms extending outwardly and upwardly from the said side of the deck over the adjacent side of the cradle, a tilting bundle carrier sliding on the arms, a crank shaft adjacent the lower ends of the arms having cranks of unequal length and links connecting different parts of the said carrier with different cranks of the crank shaft.

23. In a harvesting machine, in combination, bundle forming mechanism including a deck on which the bundles are tied, a bundle collecting and shock forming cradle located at one side of the deck, a bundle conveyer extending outwardly and upwardly from the said side of the deck over the adjacent side of the cradle, a frame hingedly connected to the top of the conveyer to swing upon a horizontal axis and means automatically operable upon the actuation of the said conveyer for raising the said frame to a substantially horizontal bundle receiving position, said means being constructed to permit the lowering of the frame when a bundle is deposited thereon.

24. In a harvesting machine, in combination bundle forming mechanism including a deck on which the bundles are tied, a bundle collecting and shock forming cradle located at one side of the deck, a slideway for a reciprocating bundle carrier extending outwardly and upwardly from the said side of the deck over the adjacent side of the cradle, a frame hingedly connected to the top of the slideway to swing upon a horizontal axis, a crank arm pivotally connected to the slideway adjacent its lower end, a link connecting the crank arm and frame, a cam rotatably mounted in the slideway adjacent the crank arm, a cam roller on the crank arm running on the cam, a carrier running in the slideway, and means for actuating the cam and carrier in unison.

LOUIS ANDERSON.

Witnesses:
CHARLES B. GILLSON,
E. M. KLATCHER.

Copies of this patent may be obtained for five cents each, by addressing the "Commissioner of Patents, Washington, D. C."